United States Patent
Franke et al.

(10) Patent No.: US 11,985,197 B2
(45) Date of Patent: May 14, 2024

(54) SYSTEM AND METHOD FOR COMMUNICATING WITH A MOTOR VEHICLE

(71) Applicant: Audi AG, Ingolstadt (DE)

(72) Inventors: Christoph Franke, Ingolstadt (DE); Kevin Konradt, Lenting (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 18/256,743

(22) PCT Filed: Nov. 22, 2021

(86) PCT No.: PCT/EP2021/082524
§ 371 (c)(1),
(2) Date: Jun. 9, 2023

(87) PCT Pub. No.: WO2022/122366
PCT Pub. Date: Jun. 16, 2022

(65) Prior Publication Data
US 2024/0031440 A1    Jan. 25, 2024

(30) Foreign Application Priority Data
Dec. 9, 2020    (DE) ..................... 10 2020 132 712.9

(51) Int. Cl.
*H04L 67/125*    (2022.01)
*H04L 51/02*    (2022.01)
*H04L 51/52*    (2022.01)

(52) U.S. Cl.
CPC .......... *H04L 67/125* (2013.01); *H04L 51/02* (2013.01); *H04L 51/52* (2022.05)

(58) Field of Classification Search
CPC ....... H04L 67/125; H04L 51/02; H04L 51/52; H04L 67/306
See application file for complete search history.

(56) References Cited

U.S. PATENT DOCUMENTS 10,334,050 B2   6/2019   Kentley-Klay et al.
2017/0305437 A1*   10/2017   Onorato ................. G06Q 50/40
2017/0353559 A1   12/2017   Seo et al.

FOREIGN PATENT DOCUMENTS

CN    108391004 A     8/2018
CN    111405041 A *   7/2020 ............. B60R 16/02
(Continued)

OTHER PUBLICATIONS

International Preliminary Report on Patentability directed to related International Application No. PCT/EP2021/082524, dated Mar. 13, 2023, with attached English-language translation; 15 pages.
(Continued)

*Primary Examiner* — Soe Hlaing
(74) *Attorney, Agent, or Firm* — Sterne, Kessler, Goldstein & Fox P.L.L.C.

(57) ABSTRACT

The present disclosure relates to a system and a method for communicating with a motor vehicle. The method comprises providing a social media interface for the motor vehicle on a specified vehicle fleet server, wherein a communication is provided via a social media application through the social media interface, receiving a message from a mobile terminal through the social media interface, ascertaining a vehicle function call from the message by an interpretation program, wherein semantics of the message are interpreted by in order to ascertain the vehicle function call, carrying out the ascertained vehicle function call in the motor vehicle, and sending a response message from the vehicle fleet server to the mobile terminal if, as a response to the vehicle function call, the vehicle fleet server obtains a vehicle parameter from the motor vehicle, wherein the response message is generated depending on the obtained vehicle parameter.

9 Claims, 2 Drawing Sheets

(56) References Cited

FOREIGN PATENT DOCUMENTS

| | | |
|---|---|---|
| CN | 111405041 A | 7/2020 |
| DE | 102009037234 A1 | 2/2011 |
| DE | 102016008396 A1 | 1/2018 |
| KR | 20180116986 A | 10/2018 |

OTHER PUBLICATIONS

International Search Report and Written Opinion of the International Searching Authority directed to related International Patent Application No. PCT/EP2021/082524, dated Mar. 1, 2022, with attached English-language translation; 21 pages.

Nuruzzaman, Mohammad et al., "A Survey on Chatbot Implementation in Customer Service Industry through Deep Neural Networks," 2018 IEEE 15th International Conference on e-Business Engineering, 2018; 8 pages.

Fridman, Lex, "Human-Centered Autonomous Vehicle Systems: Principles of Effictive Shared Autonomy," Massachusetts Institute of Technology, arxiv.org, Cornell University Library, Oct. 3, 2018; 9 pages.

Sanjeevi, Madhu, "Chapter 11: ChatBots to Question & Answer systems," Deep Math Machine learning.ai; Apr. 19, 2018; 19 pages.

* cited by examiner

SYSTEM AND METHOD FOR COMMUNICATING WITH A MOTOR VEHICLE

TECHNICAL FIELD

The present disclosure relates to a system and a method for communicating with a motor vehicle.

BACKGROUND

Digital networking between persons continues to advance. Social media applications are often used for networking in order to communicate with one another and send messages and/or media content via the social media applications. There are a number of providers of social media applications, for example commercial or non-commercial providers with which people can network in communities in that the persons create a social media profile with the relevant provider in order to be able to use the social media applications. For example, texts, in particular text messages, and/or voice messages can then be exchanged using the social media application. Some providers of social media applications for communicating between individuals are, for example, WhatsApp™, Threema™, Facebook™, Twitter™, Signal™ or iChat™.

Networking with objects also continuously increases. For example, motor vehicles are already connected to a server, in particular a vehicle fleet server, which is operated, for example, by a manufacturer of the motor vehicle. This allows users to request data from the motor vehicle and to remotely control functions of the vehicle, wherein an application or remote control provided by the vehicle manufacturer is usually used for this purpose. For example, the state of charge of a high-voltage battery can be requested, or the auxiliary heating system can be activated.

For example, DE 10 2016 008 396 A1 comprises a system for the wireless control of functions of a vehicle, wherein a communication module enables wireless communication between a control unit of the vehicle and a remote control.

From U.S. Pat. No. 10,334,050 B2, a software application and logic are known for modifying a setting of an autonomous vehicle.

CN 108391004 A comprises a vehicle control system and a method which is based on a mobile telephone application, wherein a specified instruction is sent via the mobile telephone application to a short message control unit, wherein the short message control unit forwards the received instructions to a vehicle control unit which controls a corresponding function apparatus to execute the instruction.

A disadvantage of known apparatuses and methods is that for communication with the motor vehicle, a user requires a specific application that is provided by the manufacturer and must first be installed on his mobile terminal. The user must also learn the application and its functions. For example, the user must become familiar with a menu structure before he can effectively use the application.

BRIEF DESCRIPTION OF DRAWINGS/FIGURES

DETAILED DESCRIPTION

Figure 1:
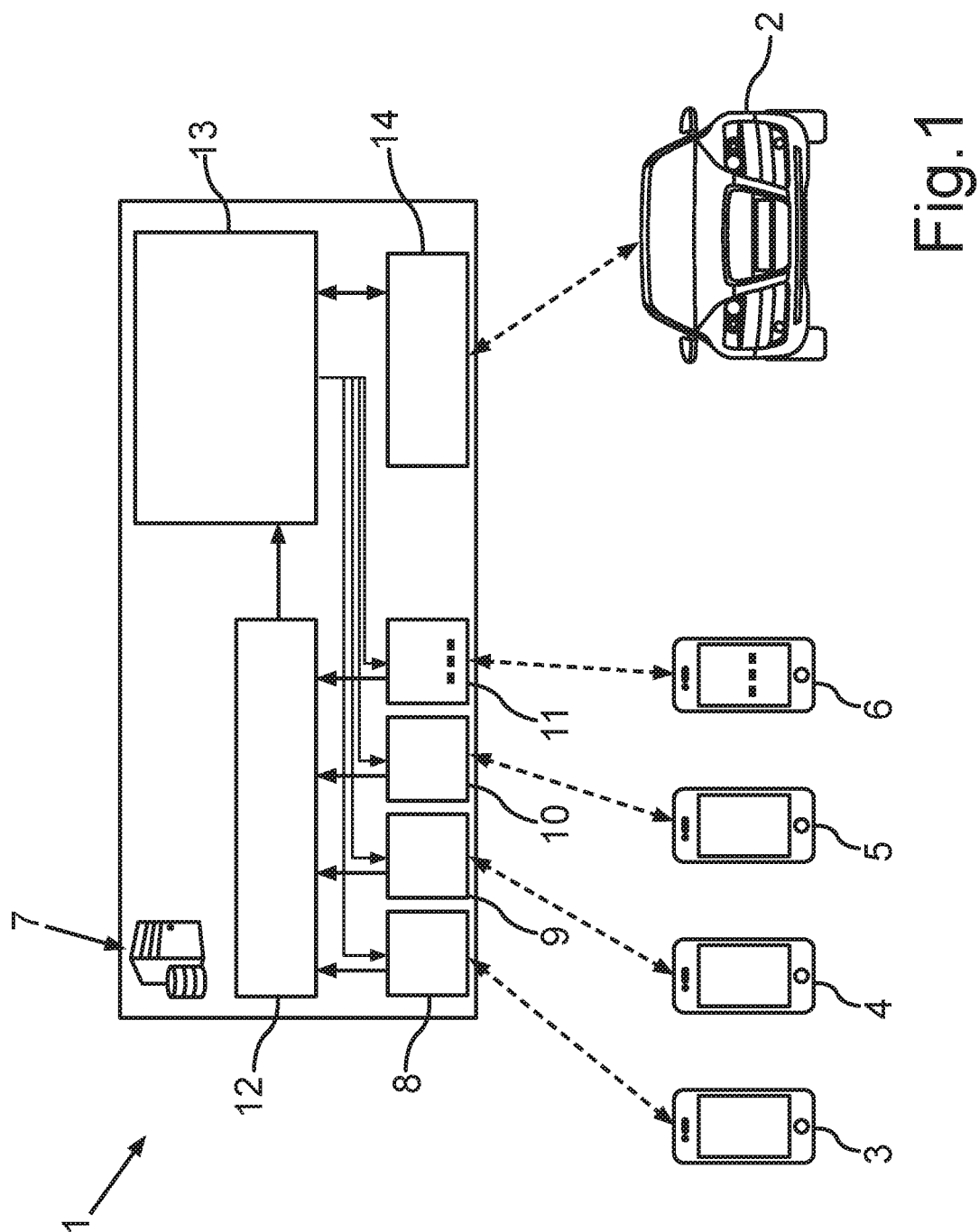
FIG. 1 illustrates a schematic system for communicating with a motor vehicle according to an exemplary embodiment.

The present disclosure is based on the object of facilitating communication with a motor vehicle.

This object is achieved by the independent claims. Advantageous developments of the present disclosure are disclosed in the dependent claims, the following description, and the figures.

The present disclosure is based on the basic idea that existing social media applications with which a user is familiar can be used to enable the communication, in particular controlling and requesting vehicle parameters. It is preferably provided that for this purpose, the user does not have to learn any fixed commands and instructions, but the command can be extracted from a sent message.

The present disclosure provides a method for communicating with a motor vehicle. The method comprises, as step a), providing at least one social media interface for communicating with the motor vehicle on a specified vehicle fleet server, wherein communication via a social media application is provided through the social media interface. The vehicle fleet server is preferably an off-board server which can be operated, for example, by a manufacturer of the vehicle. In particular, however, the social media application can be provided by a manufacturer not associated with the vehicle. The social media application can preferably be freely selected according to the user's wishes and preferences. Preferably used in this case are social media applications by means of which a message exchange, i.e., communication between different users, can take place. This means that at least text messages and/or voice messages can be sent. Alternatively, it may also be provided that video messages can be sent for communication. A social media interface provided on the vehicle fleet server means an interface, in particular a software interface, which can receive messages via the social media application and provide them to further programs. Preferably, the social media interface can be designed as a program element on the vehicle fleet server, wherein the program element can simulate a receiving device, for example a further mobile terminal, which has the social media application. Particularly preferably, a social media profile of the motor vehicle can be created in a preceding step, i.e., a profile for the motor vehicle with a provider of the social media application.

In a further step, the method comprises, as step b), receiving a message from a mobile terminal through the social media interface of the specified vehicle fleet server by means of the social media application. For example, the social media application can thus be used by the mobile terminal to compose a message and send it via the social media application to the social media interface of the vehicle fleet server, wherein the social media interface can be assigned to the motor vehicle. This means that the social media interface can preferably have a unique assignment to the motor vehicle, for example via a vehicle identification number. The motor vehicle is thus linked to the provider of the social media application. Alternatively, the social media interface may also not be directly linked to the motor vehicle but only to a manufacturer of the motor vehicle. In this case, an assignment to the appropriate motor vehicle can, for example, be carried out using an identification of the mobile terminal from which the message originates. Mobile telephones, in particular smartphones, tablet computers or smart watches, can be used as the mobile terminal.

Subsequently, in a step c), a vehicle function call from the received message can be ascertained by an interpretation program, wherein semantics of the message are interpreted by the interpretation program in order to ascertain the vehicle function call. A vehicle function call can, for example, be a retrieval and/or setting of a vehicle parameter, wherein a vehicle parameter can, for example, be a result of a sensor measurement of the motor vehicle, such as current/voltage sensors, temperature sensors and brightness sensors. Alternatively or additionally, a vehicle parameter can also be set or adjusted by means of the vehicle function call. For example, an internal temperature of the motor vehicle can be set by means of the vehicle function call. Consequently, the vehicle function call is an instruction or a control command for requesting and/or setting a vehicle parameter.

However, the exact control command, i.e., the correct wording of the vehicle function call, does not have to be provided by the interpretation program in the received message; instead, the interpretation program can analyze semantics of the message in order to extract the vehicle function call from the message. For this purpose, the interpretation program can, for example, analyze the messages for sentence or word patterns and compare them to similar patterns, which can be specified, for example, in a database. If a match is found, it can be determined how the message is to be interpreted. In particular, it can be determined which vehicle function call is present in the message, or whether a vehicle function call is in fact in the message, wherein the method can be aborted if no vehicle function call is found.

After ascertaining the vehicle function call, the method comprises, in step d), carrying out the ascertained vehicle function call in the motor vehicle, wherein the vehicle fleet server accesses the motor vehicle via a vehicle interface for carrying out the function call and, as step e), sending a response message from the vehicle fleet server to the mobile terminal by means of the social media application if the vehicle fleet server obtains a vehicle parameter from the motor vehicle in response to the vehicle function call, wherein the response message is generated depending on the obtained vehicle parameter. In other words, after the vehicle function call has been ascertained, the motor vehicle is controlled by the vehicle fleet server to carry out the associated vehicle function. This means that a vehicle parameter can be retrieved or set. For this purpose, the vehicle fleet server can preferably have a vehicle interface which sends the vehicle function call to the motor vehicle, for example to a control unit of the motor vehicle. After the vehicle function call has been carried out, it can be checked whether the motor vehicle offers a vehicle parameter to the vehicle fleet server in response to the vehicle function call. If not, the method can end at this point, if, for example, only one vehicle parameter is to be set, but no feedback is desired. However, if a vehicle parameter is obtained, the vehicle fleet server can, after the vehicle parameter has been obtained, create a response message and send it to the mobile terminal by means of the social media application. The response message here is preferably a text or a voice message which is generated by the vehicle fleet server and into which the vehicle parameter is inserted or embedded. This means that not only is the vehicle parameter sent as a single numerical value as a response message, it can also be incorporated into a complete response sentence. Thus, the initial message from the mobile terminal to the social media profile of the motor vehicle may, for example, be the question: "How full is the battery?" The interpretation program can thus determine that a query of the "state of charge" of the vehicle battery is to be carried out by the vehicle function call. After retrieving this vehicle parameter, i.e., the state of charge of the battery, the sentence "the vehicle battery is charged to 87 percent" can automatically be created as a response message, for example. The response message can be generated, for example, by means of a chatbot in the vehicle fleet server in that the response message is generated, for example, by a database depending on the retrieved vehicle parameter.

The present disclosure provides the advantage that a user does not have to install any additional application on his mobile terminal, and the user can communicate with the motor vehicle by his usual medium. The user therefore does not have to learn how to use a new application, and he can communicate with his motor vehicle without having to leave his preferred application. Consequently, a user can communicate with the motor vehicle as with a social contact since the medium is the same and writing freely is possible. Also, the motor vehicle can be listed like a person in a contact list of a user, which makes it easier to reach the motor vehicle. Overall, this allows communication with the motor vehicle to be facilitated.

The present disclosure also comprises embodiments which result in additional advantages.

One embodiment provides that the message is provided as a text message and/or as a voice message and/or as a video message. In other words, the message which is sent from the mobile terminal to the vehicle fleet server by means of the social media application can be sent as a text message and/or as a voice message. For example, the interpretation program can analyze texts of the text message or an audio signal of the voice message for the presence of the vehicle function call. Alternatively, a video can also be sent as a message, wherein the video, in particular a sound track of the video, can be analyzed by the interpretation program. By means of this embodiment, the communication with the motor vehicle can be carried out by means of a classic social media application, which is particularly simple and intuitive for a user.

A further embodiment provides that, depending on the obtained vehicle parameter, the response message also comprises a setting query for setting the vehicle parameter, wherein a reply via the social media application is expected by the vehicle fleet server, wherein the vehicle fleet server sends the vehicle function call for setting the vehicle parameter to the motor vehicle if the interpretation program interprets a setting intent from the reply. In other words, not only the vehicle parameter but also a setting query as to whether the vehicle parameter should be changed can be sent to the mobile terminal as a response message. In this case, the setting query can depend on the obtained vehicle parameter, for example if the vehicle parameter is outside a specified standard range. For example, the vehicle parameter can comprise a temperature which is present in the motor vehicle. If the temperature is below or above a specified threshold value, the setting query may, for example, be whether a heating and/or an air-conditioning system is to be activated. Then a reply as to whether the setting should or should not be performed can be awaited, in particular for a specified time. For example, after sending the setting query to the mobile terminal, it is possible to wait for a period of five minutes to see whether there has been a confirmation. If it has been confirmed, the vehicle fleet server can then generate a vehicle function call and send it to the motor vehicle so that the vehicle parameter can be set accordingly. This embodiment provides the advantage that the motor vehicle, in particular functions of the motor vehicle, can be intuitively and easily retrieved and controlled since the control of the vehicle functions is carried out in the form of a dialog via the social media application.

It is preferably provided that the response message of the vehicle fleet server is generated by a chatbot. The chatbot can preferably be a part of a function program on the vehicle fleet server, wherein the function program can convert the vehicle function calls into control commands for the motor vehicle and/or can obtain vehicle parameters from the motor vehicle. A chatbot means a text-based dialog system which can evaluate and create text input and text output and, in doing so, can imitate a person in an artificial manner. This results in the advantage that the motor vehicle is perceived less as a technical object and more as a personality, which leads to a closer bond of the user to the motor vehicle. Furthermore, communication with the motor vehicle can thus be facilitated.

It is particularly preferably provided that the interpretation program comprises a self-learning algorithm that recognizes semantics of the messages from the mobile terminal in order to ascertain the vehicle function call. In other words, the interpretation program can be based on artificial intelligence that can also learn messages of the user and can thus adapt to a speech and writing style of the user. Vehicle function calls from the messages can thus be recognized in an improved manner. The self-learning algorithm can preferably also be carried out on a function program of the vehicle fleet server and recognize behavior patterns of a user, as a result of which setting queries to the mobile terminal of the user can be created automatically. For example, the self-learning algorithm can know that a user always uses the motor vehicle at a particular time in the morning. From this information, for example at a time before use of the motor vehicle, a setting query, for example whether an auxiliary heating system is to be activated, can be generated and is sent to the mobile terminal of the user.

A further embodiment provides that the vehicle fleet server ascertains which vehicle functions are provided by the motor vehicle, wherein an error message is sent from the vehicle fleet server to the mobile terminal if an unavailable vehicle function is ascertained as the vehicle function call. In other words, it can be ascertained, for example after a social media profile has been created for the motor vehicle, which vehicle functions are present at all in the motor vehicle. For example, the motor vehicle can have an internal combustion engine, and a vehicle function call with respect to a traction battery capacity can accordingly be answered with the error message. In order for the vehicle fleet server to determine which vehicle functions are present in the motor vehicle, a vehicle feature may be requested, for example based on the vehicle identification number, from a database in which the features can be stored. Alternatively, the vehicle fleet server can also control a central control unit of the motor vehicle that can communicate which vehicle functions are present in the motor vehicle. This embodiment provides the advantage that data traffic to the motor vehicle can be limited since vehicle functions that are unavailable are not queried by the vehicle fleet server in the first place.

A further embodiment provides that the method also comprises the following steps before step b): creating a social media profile for the motor vehicle and linking the social media profile to the social media interface of the vehicle fleet server, wherein upon linking the social media profile to the social media interface, an authorization query is sent to the motor vehicle, wherein the linking is carried out only if the authorization query is approved from the motor vehicle. In other words, in order to authenticate that the creator of the social media profile is the owner of the motor vehicle, an authorization query can be sent to the motor vehicle, for example to an infotainment system of the motor vehicle. Only after this authorization query is confirmed can the social media profile be linked to the social media interface that enables access to the motor vehicle. This results in the advantage that safety can be increased.

A further embodiment provides that a plurality of social media interfaces of different providers are provided for the motor vehicle on the vehicle fleet server. The vehicle fleet server and the motor vehicle are thus not limited to a social media application of one provider; instead, the vehicle fleet server can have interfaces for a plurality of different providers. For example, a plurality of persons who share the motor vehicle but use different social media applications, can also access the functionality provided by the method.

It is preferably provided that, when the message is received in step b), it is also checked whether a sender of the message has an authorization for communication, wherein the subsequent steps of the method are carried out only if the sender has the authorization. In other words, mobile terminals can be enabled or blocked for communication with the motor vehicle. For example, a plurality of persons who use the same social media application and have contact with the social media profile of the motor vehicle can thus send messages to the social media profile of the motor vehicle, wherein only those messages for which an authorization exists are processed further. Alternatively, when there is a message from an unauthorized user, the vehicle fleet server can generate an authorization query which can be sent to an authorized user, in particular an owner of the motor vehicle. The owner can then grant or deny the authorization for communication with the motor vehicle. On the one hand, this results in the advantage that safety can be increased and, on the other hand, a plurality of persons who use the motor vehicle and also the same social media application can, for example, access the functionality of the method.

A further aspect of the present disclosure relates to a system having at least one mobile terminal, at least one motor vehicle and a vehicle fleet server, wherein the vehicle fleet server is designed to carry out a method according to one of the preceding embodiments. The motor vehicle is preferably designed as an automobile, in particular as a passenger car or a truck, or as a passenger bus or a motorcycle. This aspect results in the same advantages and variation possibilities as in the method.

The present disclosure also includes the control apparatus for the system. The control apparatus can have a data processing apparatus or a processor device which is configured to carry out an embodiment of the method according to the present disclosure. For this purpose, the processor device can have at least one microprocessor, and/or at least one microcontroller, and/or at least one FPGA (field programmable gate array), and/or at least one DSP (digital signal processor). Furthermore, the processor device may comprise program code which, when executed by the processor device, is configured to implement the embodiment of the method according to the present disclosure. The program code can be stored in a data storage device of the processor unit.

The present disclosure also includes developments of the system according to the present disclosure, which developments have features as have already been described in connection with the developments of the method according to the present disclosure. For this reason, the corresponding developments of the system according to the present disclosure are not described again here.

The present disclosure also comprises the combinations of the features of the described embodiments. The present disclosure thus also comprises implementations which each have a combination of the features of a plurality of the described embodiments, provided the embodiments have not been described as mutually exclusive.

The exemplary embodiments described below are preferred embodiments of the present disclosure. In the exemplary embodiments, the described components of the embodiments each represent individual features of the present disclosure, which are to be considered independently of one another and also respectively develop the present disclosure independently of one another. For this reason, the disclosure is also intended to include other combinations of the features of the embodiments than those described. Furthermore, the described embodiments can also be complemented by further, already described features of the present disclosure.

In the figures, the same reference signs refer to functionally identical elements.

FIG. 1 shows a schematic system 1 for communicating with a motor vehicle 2 according to an exemplary embodiment. In addition to the motor vehicle 2, the system 1 can have at least one mobile terminal 3, 4, 5, 6 and a vehicle fleet server 7. Alternatively, a plurality of servers, in particular a computer cloud, can also be used, wherein different function steps of the can, for example, be distributed to the servers.

The mobile terminals 3, 4, 5, 6 can be designed as a smartphone and/or as a tablet PC, for example, wherein different social media applications can respectively be operated on the mobile terminals 3, 4, 5, 6. For example, the mobile terminal 3 can have a different social media application than the mobile terminal 4. Social media interfaces 8, 9, 10, 11 for the corresponding social media applications can preferably be provided on the vehicle fleet server 7.

For communication with the motor vehicle 2, for example in order to request a sensor value or control a vehicle function, it can be provided that a social media profile for the motor vehicle has been created with a provider of the social media application. A message can then be sent, for example from the mobile terminal 3, to this social media profile of the motor vehicle 2, wherein the message is received by that social media interface 8 of the vehicle fleet server 7 that is provided to match the social media application of the mobile terminal 3. The received message can subsequently be analyzed by an interpretation program 12, wherein semantics of the message are interpreted in order to ascertain a vehicle function call. The vehicle function call can be a command for retrieving the sensor value or for controlling another vehicle function, wherein the command does however not have to be explicitly formulated in the message. The message can be present, for example, as a text message and/or as a voice message, wherein the interpretation program 12, which is preferably based on a self-learning algorithm, can analyze the wording and/or the sentence structure of the message as to whether the command for retrieving the sensor value can be extracted from the message. This means that the interpretation program 12 determines the intention behind the message.

If such a vehicle function call is ascertained from the received message by the interpretation program 12, a function program 13 of the vehicle fleet server 7 can subsequently convert the vehicle function call into a control signal which comprises logical portions of an interaction with the motor vehicle 2. In other words, the function program 13 can convert the recognized vehicle function call into a control signal such that a function of the motor vehicle 2, in particular a sensor of the motor vehicle 2, can be controlled therewith. Subsequently, the control signal can be sent by means of a vehicle interface 14 to the corresponding motor vehicle 2. Preferably, a vehicle parameter in the motor vehicle can then be ascertained or set, for example in that the sensor of the motor vehicle 2 is triggered by the control signal and measures the sensor value. The vehicle parameter measured in this way can subsequently be retransmitted to the vehicle fleet server 7, wherein the vehicle parameter is received by the vehicle fleet server 7 by means of the vehicle interface 14.

For example, in the vehicle fleet server 7, the function program 13 can generate a response message by means of the received vehicle parameter, wherein the response message can be sent back to the mobile terminal 3 by means of the social media application. For generating the response message, a chatbot can preferably be used which inserts the vehicle parameter into a text so that the impression arises that the response message originates from a real person. It can preferably also be provided that depending on the retrieved vehicle parameter, the response message also comprises a setting query for setting the vehicle parameter. This means that the vehicle parameter can be queried as well as set. For this purpose, after sending the response message, the vehicle fleet server 7 can, for example, wait a specified time for a reply that can be interpreted as an intent to set the vehicle parameter.

For example, a user can write to the motor vehicle 2 via his social media application of the mobile terminal 3: "How warm is it?" The message is received through the social media interface 8, 9, 10, 11 of the vehicle fleet server 7, and the interpretation program 12 interprets the content of the message. For example, a vehicle function call with the content "request outside temperature" can be recognized as the content. This can then be forwarded to the function program 13 of the vehicle fleet server 7. The function program 13 can then access the motor vehicle 2 via the vehicle interface 14 and request the vehicle parameter of the outside temperature. Based on the received value, for example 31 degrees Celsius, it is decided in the function program 13 that air conditioning of the motor vehicle 2 can be offered to the user. A response message with an additional setting query can be created, for example with the text message: "The outside temperature is 31 degrees Celsius. Should I turn on the air-conditioning system?" This response message can then be sent back to the mobile terminal 3 via the social media application, and a reply can be awaited. For example, if the user responds "Okay!", this message can again be read in and reinterpreted via the previously described value, wherein the interpretation program 12 recognizes consent to the setting query from the message. The function program 13 can then start to air-condition the motor vehicle 2 via the vehicle interface 14. A user can thus communicate or chat with his vehicle in the usual way without having to learn fixed commands for this purpose.

Figure 2:
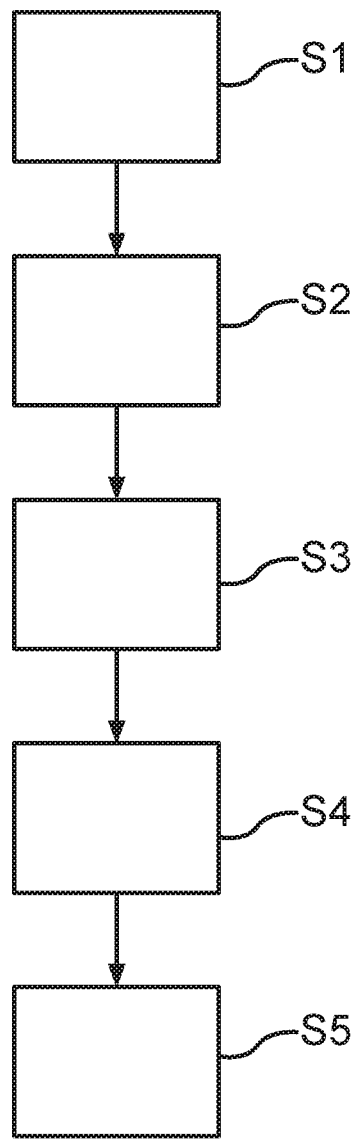
FIG. 2 illustrates a flowchart of the method for communicating with a motor vehicle according to an exemplary embodiment.

FIG. 2 illustrates a flowchart of the method for communicating with a motor vehicle 2 according to an exemplary embodiment. The method shown here can preferably be carried out by a vehicle fleet server 7. In a step S1, at least one social media interface 8 can be provided for communication with the motor vehicle. Preferably, a social media profile for the motor vehicle 2 can also be created, for example with a provider of social media applications. The social media interface 8 provides communication via a social media application which is preferably from a third-party provider, and by means of which communication can take place via text and/or voice messages.

In a step S2, a message from the mobile terminal 3 is received through the social media interface 8 of the vehicle fleet server 7 via this social media application. Subsequently, in a step S3, a vehicle function call can be ascertained from the received message by an interpretation program 12, wherein semantics of the message are interpreted by the interpretation program 12 in order to ascertain the vehicle function call. If such a vehicle function call is ascertained from the received message, the vehicle function call can be carried out in the motor vehicle (2) in a step S4; for example, at least one vehicle parameter belonging to the ascertained vehicle function call can be retrieved or set by the motor vehicle 2. Finally, in a step S5, a response message can be sent from the vehicle fleet server 7 to the mobile terminal 3 by means of the social media application if the vehicle fleet server (7) obtains a vehicle parameter from the motor vehicle (2) in response to the vehicle function call, wherein the response message is generated depending on the obtained vehicle parameter and is packed in a text message by a chatbot, for example. Steps S2 to S5 can preferably be carried out repeatedly, i.e., each time a message is received from the vehicle fleet server (7).

Overall, the examples show how the present disclosure can provide social media profiles for motor vehicles.

The invention claimed is:

1. A method for communicating with a motor vehicle, the method comprising:
   providing a social media interface for communicating with the motor vehicle on a specified vehicle fleet server, wherein the social media interface communicates with the motor vehicle via a social media application;
   receiving, by the social media application, a message from a mobile terminal of a user through the social media interface of the specified vehicle fleet server;
   ascertaining, by an interpretation program, a vehicle function call based on the message, wherein the interpretation program interprets semantics of the message to ascertain the vehicle function call;
   carrying out the vehicle function call in the motor vehicle, wherein carrying out the function call comprises the vehicle fleet server accessing the motor vehicle via a vehicle interface;
   in response to the vehicle fleet server obtaining a vehicle parameter from the motor vehicle according to the vehicle function call, sending, by the social media application, a response message from the vehicle fleet server to the mobile terminal, wherein the response message is generated based on the vehicle parameter, and wherein the response message comprises a setting query for setting the vehicle parameter based on the vehicle parameter;
   expecting, by the vehicle fleet server, a reply via the social media application,
   in response to a setting intent is interpreted from the reply by the interpretation program, generating, by the vehicle fleet server, a further vehicle function call for setting the vehicle parameter;
   sending, by the vehicle fleet server, the further vehicle function call to the motor vehicle;
   carrying out, on a function program of the vehicle fleet server, a self-learning algorithm; and
   recognizing a behavior pattern of the user, wherein the behavior pattern is based on a result of the setting query.

2. The method according to claim 1, wherein the message is provided as at least one of a text message, a voice message, or a video message.

3. The method according to claim 1, wherein the response message of the vehicle fleet server is generated by a chatbot.

4. The method according to claim 1, wherein the interpretation program comprises a self-learning algorithm to ascertain the vehicle function call, wherein the self-learning algorithm recognizes semantics of the message from the mobile terminal.

5. The method according to claim 1,
   wherein the vehicle fleet server ascertains vehicle functions that are provided by the motor vehicle, and
   wherein, in response to an unavailable vehicle function being ascertained as the vehicle function call, an error message is sent from the vehicle fleet server to the mobile terminal.

6. The method according to claim 1, wherein providing the social media interface comprises:
   creating a social media profile for the motor vehicle;
   sending an authorization query to the motor vehicle; and
   in response to the authorization query being approved from the motor vehicle, linking the social media profile to the social media interface.

7. The method according to claim 1, wherein a plurality of social media interfaces of different providers are provided on the vehicle fleet server.

8. The method according to claim 1, wherein providing the social media interface comprises:
   checking that a sender of the message has an authorization for communication.

9. A system for communication with a motor vehicle comprising:
   a mobile terminal;
   the motor vehicle; and
   a vehicle fleet server configured to:
      provide a social media interface, wherein the social media interface communicates with the motor vehicle via a social media application,
      receive a message from the mobile terminal of a user through the social media interface by the social media application,
      ascertain a vehicle function call from the message by an interpretation program, wherein the interpretation program interprets semantics of the message to ascertain the vehicle function call,
      access the motor vehicle via a vehicle interface for carrying out the vehicle function call,
      carry out the vehicle function call in the motor vehicle,
      in response to the vehicle fleet server obtaining a vehicle parameter from the motor vehicle according to the vehicle function call, send a response message to the mobile terminal by the social media application, wherein the response message is generated based on the vehicle parameter, and wherein the response message comprises a setting query for setting the vehicle parameter based on the vehicle parameter;
      expect a reply via the social media application;
      in response to a setting intent being interpreted from the reply by the interpretation program, generate a further vehicle function call for setting the vehicle parameter; and
      send the further vehicle function call to the motor vehicle,
   wherein the vehicle fleet server comprises a function program with a self-learning algorithm, wherein the self-learning algorithm is configured to recognize a behavior pattern of the user, and wherein the behavior pattern is based on a result of the setting query.

* * * * *